United States Patent [19]

Gleichman

[11] 4,072,872
[45] Feb. 7, 1978

[54] VENTILATING AIR BAFFLE AND DEFLECTOR FOR A DYNAMOELECTRIC MACHINE

[75] Inventor: Robert F. Gleichman, San Jose, Calif.

[73] Assignee: General Electric Company, Schenectady, N.Y.

[21] Appl. No.: 602,612

[22] Filed: Aug. 7, 1975

[51] Int. Cl.$^2$ .................................. H02K 9/00
[52] U.S. Cl. ........................................ 310/53; 310/58
[58] Field of Search .................. 310/52, 62, 63, 53, 310/58, 59, 60, 64, 65; 417/423 A; 415/216–218; 15/353, 412, 413

[56] References Cited

U.S. PATENT DOCUMENTS

| 1,961,387 | 6/1934 | Pfleger | 310/63 |
| 2,114,907 | 4/1938 | Oesterlein | 310/63 |
| 3,027,470 | 3/1962 | Atherton | 310/63 |
| 3,094,272 | 6/1963 | McClure | 310/63 |
| 3,207,934 | 9/1965 | Robinson | 310/64 |
| 3,407,317 | 10/1968 | Honsinger | 310/62 |
| 3,761,748 | 9/1973 | Baumann | 310/62 |
| 3,932,070 | 1/1976 | Porter | 417/423 A |

Primary Examiner—R. Skudy
Attorney, Agent, or Firm—Vale P. Myles

[57] ABSTRACT

A combination baffle and deflector for guiding ventilating air in and around a dynamoelectric machine is characterized by incorporating an annulus having integrally formed base, leg and rim portions that enable the baffle and deflector member to be mounted on one end of a dynamoelectric machine to provide optimum air flow control while also providing apparatus for blocking entry of rodents, snakes, and other similar foreign objects into the machine. In a combined form of the invention the unique baffle and deflector member is assembled with an electric motor that has a plurality of axially extending, radially projecting cooling ribs on an exterior surface of its housing. Fin portions integrally formed with the baffle and deflector member are disposed to cooperate with the cooling ribs on the motor housing to provide an efficient and inexpensive screen over one portion of the ventilating passageways through the motor.

11 Claims, 5 Drawing Figures

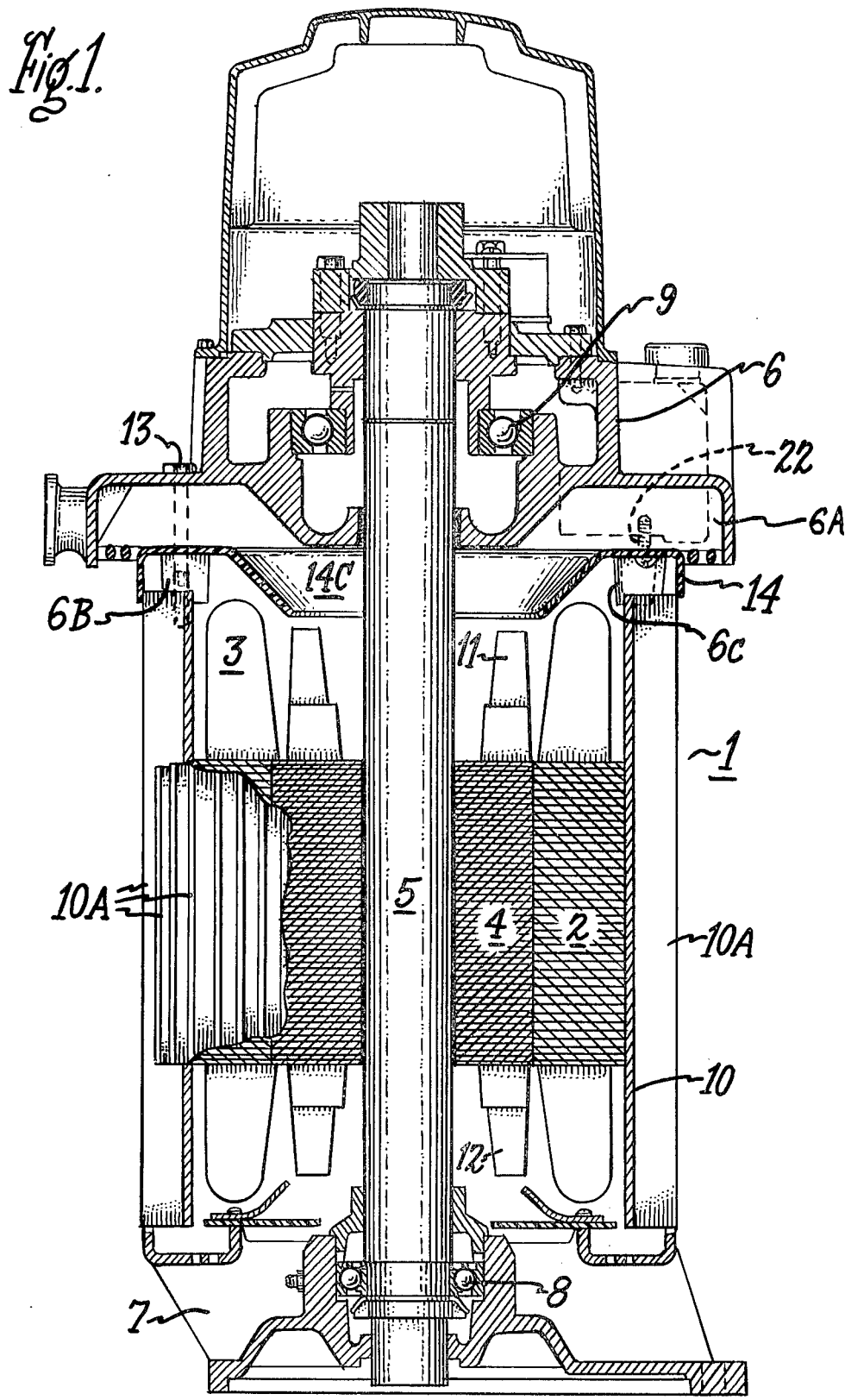

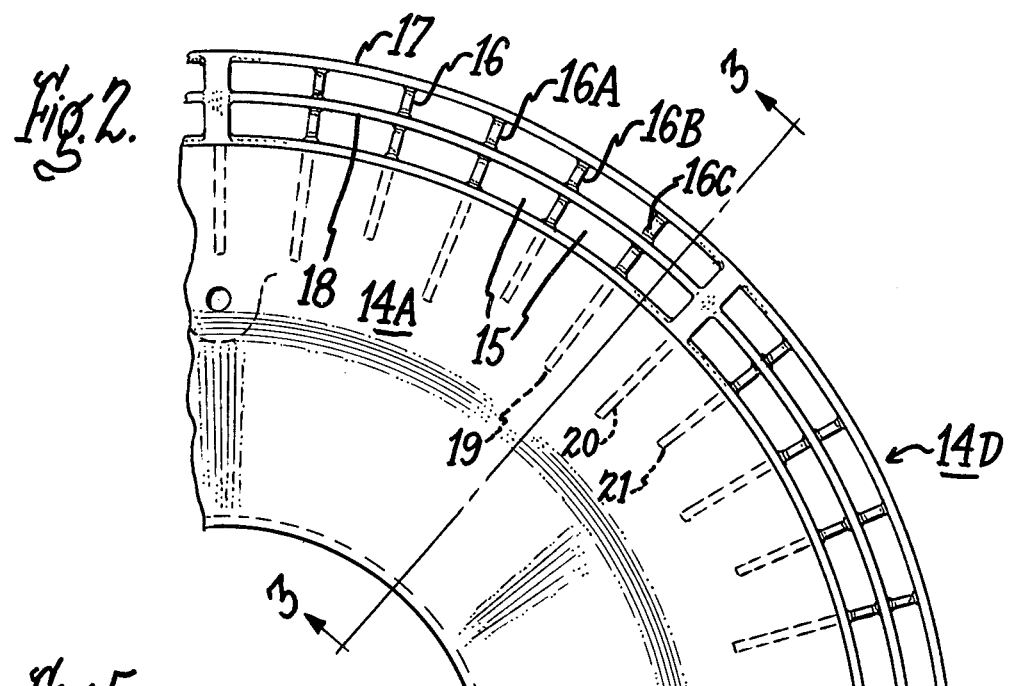
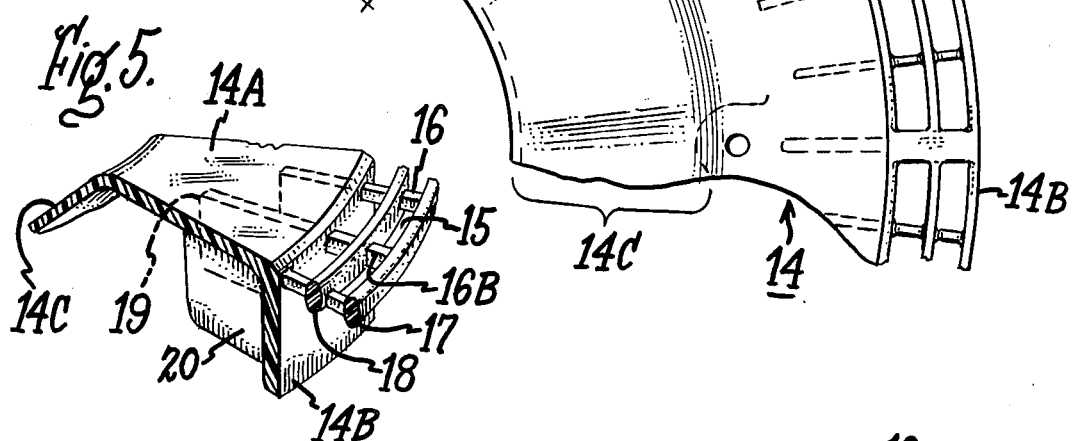
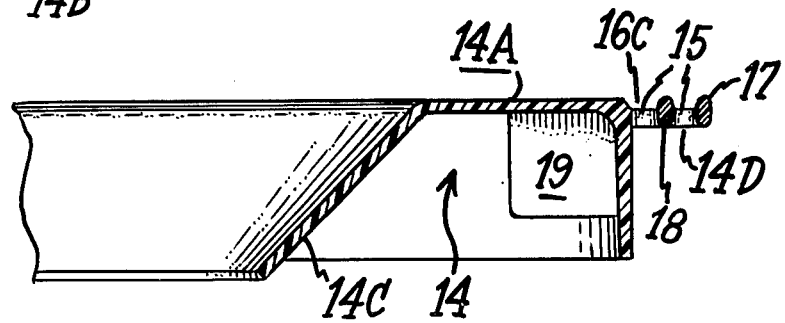
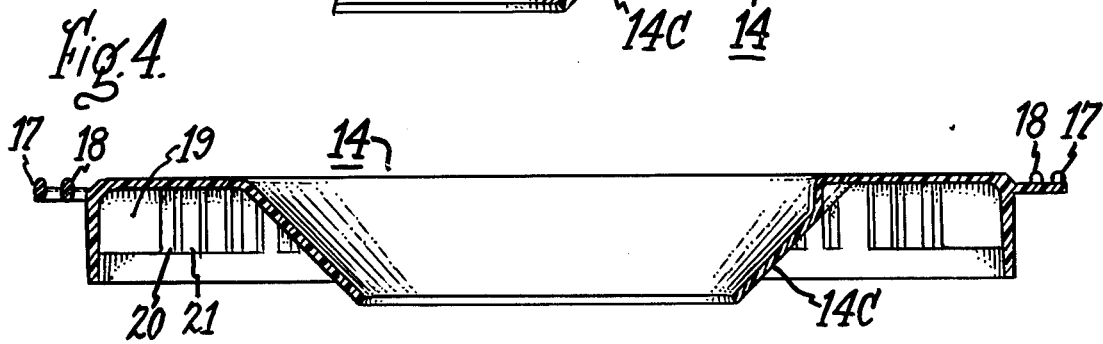

VENTILATING AIR BAFFLE AND DEFLECTOR FOR A DYNAMOELECTRIC MACHINE

BACKGROUND OF THE INVENTION

The invention relates to ventilation means for dynamoelectric machines and more particularly to a combination baffle and deflector that embodies ventilating air guiding means integrally formed with screen and fin structures that are operable to protect the interior of a dynamoelectric machine on which the combination baffle and deflector is mounted from injury due to entry therein of rodents, snakes or similar hazardous intruders.

In the design and manufacture of dynamoelectric machines it has become customary to utilize various forms of air baffles and deflectors to guide ventilating air through and around various heated components of the machines to optimize the ventilation of such parts. In general, such baffle and deflector members are conventionally arranged in or adjacent to the end turn cavities of a motor or generator housing to direct streams of incoming cooling air onto the end turns of the motor stator and rotor and thence through exhaust ports to the exterior of the machine. Frequently, such ventilating arrangements force the exhaust air over the exterior surface of the machine housing to help remove heat conducted to the housing from the stator laminations of the machine. Many examples of such prior art ventilation arrangements for electric motors are available. One example of such a conventional air inlet baffle and deflector arrangement is shown is U.S. Pat. No. 3,725,706—Lukens which issued Apr. 3, 1973 and is assigned to the assignee of the present invention.

Typically, such prior art ventilating arrangements for dynamoelectric machines either do not utilize screens or other means to protect the interior of the machines from damage by intruding small animals or other foreign objects, or if such screen arrangements are used they are simply added as a separate component at a point in the air flow stream spaced from the air baffle and deflector elements. Also, in such prior art structures it has been normal practice to provide separate air baffle members and air deflector members. For example, in the afore-mentioned Lukens patent an air baffle member 23 is used to force cooling air inward toward the motor shaft while separate air deflectors are mounted adjacent the tips of a cooling fan 22 and on the circumference of end caps 18 to direct the exhaust air axially along heat-radiating ribs 21 on the motor. In addition to being relatively expensive to manufacture, particularly in a vertical motor design where similar air flow paths would normally be formed by coring operations on the end caps, such articulated ventilating arrangements are fairly complex to install and may be subject to increased maintenance expense normally associated with a multi-part machine in which the parts are vibrated continuously against one another or relative to other components of the machine. This problem is compounded in electric motors where magnetic flux adds to the causes of vibration. As will be apparent from the following description of the invention, to the extent that components of such machines can be made of a non-magnetic material such as moldable plastics, this additional source of vibration can be minimized. Thus is can be seen that it would be desirable to provide a ventilation means for a dynamoelectric machine that would overcome these drawbacks of known prior art ventilating arrangements.

OBJECTS OF THE INVENTION

A primary object of the invention is to provide a combination cooling air baffle and deflector for dynamoelectric machines that overcomes the above-mentioned disadvantages of prior art ventilating arrangements for such machines.

A further object of the invention is to provide a combination baffle and deflector having integrally formed air-guiding vanes, rodent-blocking screens and fins that protect the air flow passageways of the machines from penetration by such animals.

Another object of the invention is to provide an improved dynamoelectric machine having a combination baffle and air deflector that efficiently and inexpensively optimizes the ventilating characteristics of a coolant air stream while preventing wildlife from entering the machine.

Additional objects and disadvantages of the invention will be apparent to those skilled in the art from the description of it that follows considered in combination with the attached drawings.

SUMMARY OF THE INVENTION

In one preferred embodiment of the invention a combination air baffle and deflector is provided with integral base, leg and rim portions that cooperate to deflect and guide cooling air in an efficient, optimum manner due to the characteristic features of the structure. Moreover, in a combined form of the invention the baffle and deflector is assembled with a dynamoelectric machine such as an electric motor to form part of the ventilating means of the machine. As thus assembled, the combination baffle and deflector is operable to guide inlet air around the end turns of a motor stator and to exhaust the air axially along the exterior of the motor housing. Also, the combination baffle and deflector includes unique screen and fin arrangements that operate effectively to block the entry of rodents and other small wildlife from the interior of the motor housing.

BRIEF DESCRIPTION OF THE DRAWING

FIG. 1 is an axial cross sectional view of a dynamoelectric machine having mounted therein a combination baffle and deflector constructed pursuant to the teaching of the present invention.

FIG. 2 is a fragmentary, top plan view of a segment of the combination baffle and deflector illustrated in its assembled position in FIG. 1.

FIG. 3 is a cross sectional view through one side of the combination baffle and deflector taken along the plane 3—3 illustrated in FIG. 2.

FIG. 4 is an axial cross section, in reduced scale, of the combination baffle and deflector shown in FIG. 1.

FIG. 5 is a fragmentary, perspective view of the combination baffle and deflector shown in FIGS. 1-4.

DESCRIPTION OF THE PREFERRED EMBODIMENT

Referring now to FIG. 1, it will be seen that there is shown a dynamoelectric machine 1 having a laminated stator 2 provided with a conventional stator winding 3 mounted thereon, a suitable rotor 4 mounted for rotation on a shaft 5 that is journaled in housing end caps 6 and 7 and rotatably supported on guide bearing 8 and thrust bearing 9, respectively, mounted at the bottom and upper ends of the machine. The housing for machine 1 is completed with a central cylindrical housing portion 10 that is shrunk fit or otherwise suitably clamped around the laminated stator 2 in any conventional manner. To optimize the heat dissipating characteristics of the machine, the central portion of the housing 10 is provided with integral, axially extending ribs 10A projecting radially outward therefrom.

Cooling air is drawn into the housing of machine 1 by a pair of fans 11 and 12 mounted, respectively, on the opposite ends of rotor 4. Access for the cooling air is provided by wall means 6A in end cap which operates in combination with the upper end of the central housing portion 10 to define a plurality of air inlet passageways around the end cap-supporting struts 6B and 6C, etc. that are used to space the main body portion of end cap 6 from the upper end of the central housing portion 1. In this form of the invention the end cap 6 is secured to the central housing portion 10 by a plurality of bolts, such as the bolt 13 illustrated in FIG. 1 to the left side of end cap 6.

From the description of the invention that follows, it will be appreciated that although the components of dynamoelectric machine 1 described above are exemplary of one type of machine with which the combination baffle and deflector of the invention will operate, other types of dynamoelectric machines are equally suitable for use in practicing the invention described herein. Thus, various conventionally available dynamoelectric machines or various combinations of component parts thereof can be used in lieu of the particular structures and arrangements illustrated in FIG. 1 and described generally above.

Pursuant to one aspect of the present invention there is shown assembled in combination with the motor 1 a combination baffle and deflector 14 that will now be described in detail with reference to FIGS. 2, 3, 4 and 5 of the drawing. Subsequently, the optimum operating characteristics of the cooling and wildlife-blocking features of the combination baffle and deflector 14, as used in association with a dynamoelectric machine such as machine 1, will be discussed in more detail with reference to FIG. 1.

As shown best in FIGS. 3 and 4, the combination baffle and deflector 14 used for guiding ventilating air in and around dynamoelectric machine 1, comprises an integral annulus (designated 14) that is formed of a thermosetting plastic material that is molded into rigid form in the preferred embodiment of the invention, but that may be formed of any suitable moldable material in alternative embodiments of the invention. The annulus 14 has a generally U-shaped configuration as seen in cross section on the radial plane 3—3 through its central axis and one side thereof, as depicted in FIG. 3. This generally U-shaped configuration consists of a base portion 14A that is generally flat, as shown, in this embodiment. Integrally formed with the base portion 14A is an outer leg portion 14B, and an inner leg portion 14C that is sloped toward the center of the annulus 14, away from the base portion 14A. Finally, an integral rim portion 14D extends outward from the junction of the outer leg portion 14B and the base portion 14A. In order to perform the desired air baffling and deflecting functions of the invention, the base portion 14A and the inner and outer leg portions 14B and 14C are made substantially impervious to air. On the other hand, the rim portion 14D is provided with suitable wall means that define apertures through the rim portion to enable air to pass through it. Several of these apertures are designated by the number 15 in FIGS. 2, 3 and 5. In the preferred embodiment of the invention described herein the apertures 15 are defined by a plurality of radially extending spokes 16, 16A, 16B etc. (FIGS. 2 and 5) that are respectively disposed in a plane that extends substantially perpendicularly outward from the outer leg portion 14B of annulus 14 as clearly seen in FIG. 3. Cooperating with the spokes 16 is a first outer ring portion 17 supported on the outer ends of the spokes 16, 16A etc. and a second ring portion 18 that is supported on the spokes intermediate their respective ends to define the apertures 15 in the form they are arranged as a grid structure on rim portions 14D.

Pursuant to the present invention, the apertures 15 as defined by the spokes and supported rings 17 and 18 are made sufficiently small effectively to block the passage of small animals, birds or snakes therethrough so that these objectionable intruders are prevented from passing the rim portion when it is mounted in an air inlet passageway, such as the passageway defined by wall means 6A of motor end cap 6 illustrated in FIG 1. Thus, it will be understood that various other suitable configurations or grid structures may be formed in the rim portion 14D to afford this desirable objective of the invention in alternative embodiments thereof.

A further unique feature of the present invention is the provision of a plurality of generally flat-sided fins 19, 20, 21 etc. disposed between the outer leg portion 14B and the base portion 14A of the annulus 14, with the flat side of each fin being substantially perpendicular to the base portion as illustrated by the phantom view in FIG. 2, the side elevation views in FIGS. 3 and 4 and the perspective view of FIG. 5. The purpose of the fins 19 is to provide a means for effectively blocking the entry of undesirable wildlife through the exhaust air passageways defined by the combination baffle and deflector when it is mounted on a motor, such as the motor 1 shown in FIG. 1. Thus, it will be appreciated that a variety of suitable configurations for the fins 19, 20. 21 etc. may be used in alternate embodiments of the invention. However, in the preferred embodiment being disclosed here, the maximum length of each of the fins 19-21 etc. is at least 25 percent of the width of the base portion 14A of the annulus and preferably is about one half the radial width of the base portion, as shown. Likewise, the width of each of these fins, measured parallel to the outer leg portion 14B, is at least 25 percent of the length of the outer leg portion and preferably at least one half as long as outer leg portion 14B. It has been found preferable, as disclosed in this embodiment of the invention, to support each of the fins 19-21 etc. on both the base portion 14A and the outer leg portion 14B so that the fins are rigidly held in position to resist forces that may be exerted on them by animals attempting to detroy or deflect the fins. To accomplish such a support in the disclosed form of the invention, the fins are molded integrally with the other portions of the annulus 14, but it will be understood that other suitable support means can be used to afford this function.

Now, referring again to FIG. 1, an embodiment of the invention will be described in which the combination baffle and deflector annulus 14 is assembled in combination with a motor 1. In this preferred assembly, the base portion 14A of the annulus is positioned adjacent to the upper end of the central housing portion 10 of the motor. At the same time the outer leg portion 14B of the annulus is disposed around the outer edges of one end of the cooling ribs 10A on the central housing portion 10, as shown, and each of the fins 19–21 etc. is positioned, respectively, intermediate the ends of two of the ribs (10A) on central housing portion 10. Actually, in order to most effectively prevent the entry of animals into the motor 1, the fins should each be placed at approximately the midpoint of the channel defined by the two ribs adjacent to it thereby to divide the cross sectional area of the potential entry tunnels in half. To best assure the effectiveness of this screening arrangement, the fins 19–21 etc. are formed so that each of them is approximately equal in radial length to the radial width of the ribs 10A of a motor, such as the motor 1, with which they are designed to be associated. Alternative relative radial widths of the ribs and axial lengths of associated fins of the baffle and deflector annulus may be used in alternate embodiments of the invention, as determined desirable by the particular nature of screening size needed in given circumstances.

Finally, to assure this optimum positioning of the annulus 14, suitable holding means, such as the screw 22 illustrated in FIG. 1, are used to fix the relative position of the ribs and the fins by fastening the annulus 14 to the end cap 6 of motor 1 which, in turn, is secured in the manner noted above by screws (13) to the central housing portion 10.

Those skilled in the art will recognize that various modifications and alternative forms of the invention may be produced from the description of it given herein; therefore, it is my intention to encompass within the scope of the following claims the true limits of the invention.

What I claim is:

1. A combination baffle and deflector for guiding ventilating air in and around an electric machine, comprising an annulus formed of moldable material, said annulus having a generally U-shaped configuration in cross-section on a radial plane through the central axis and one side thereof, said generally U-shaped configuration consisting of a base portion, an outer leg portion substantially vertically disposed relative to the base portion, an inner leg portion sloped toward the center of the annulus away from said base, a rim portion comprising a plurality of spokes disposed in a plane extending substantially perpendicularly outward from said outer leg portion from an area thereof closely adjacent the junction of the outer leg portion and said base portion, said base portion and said inner and outer leg portions being formed as an integral unit and being substantially impervious to air, and wall means defining apertures through said rim portion to enable air to pass therethrough.

2. An invention as defined in claim 1 wherein said rim portion includes a ring portion supported on the outer ends of said spokes.

3. An invention as defined in claim 2 wherein said rim portion includes at least one additional ring portion supported by said spokes intermediate their respective ends whereby a grid structure is defined by the rings and spokes of said rim portion.

4. An invention as defined in claim 1 including a plurality of generally flat-sided fins disposed between said outer leg portion and said base portion with the flat sides of said fins extending substantially perpendicular to said base portion.

5. An invention as defined in claim 4 wherein the maximum length of each of said fins measured perpendicular to said outer leg portion is at least 25 percent of the radial width of said base portion.

6. An invention as defined in claim 5 wherein the width of each of said fins, measured parallel to said outer leg portion, is at least 25 percent of the axial length of said outer leg portion.

7. An invention as defined in claim 6 wherein each of said fins is supported by both said base portion and said outer leg portion.

8. An invention as defined in claim 4 in combination with a dynamoelectric machine having a housing comprising a central portion with axially extending ribs projecting radially outward therefrom, said base portion being positioned adjacent one end of said central portion of the housing, said outer leg portion being disposed around the outer edges of one end of said ribs, and each of said fins being positioned, respectively, intermediate and axially outward from the ends of two of said ribs.

9. An invention as defined in claim 8 wherein each of said fins is approximately equal in radial length to the radial width of said ribs.

10. An invention as defined in claim 8 including holding means for holding said fins in a fixed position relative to said ribs, said fixed position being effective to place one of said ribs respectively at the approximate mid-point between each pair of immediately adjacent ribs.

11. A combination baffle and deflector for guiding ventilating air in and around an electric machine, comprising an annulus formed of moldable material, said annulus having a generally U-shaped configuration in cross-section on a radial plane through the central axis and one side thereof, said generally U-shaped configuration consisting of a base portion, an outer leg portion substantially vertically disposed relative to the base portion, an inner leg portion sloped toward the center of the annulus away from said base portion, and a rim having its radially inner end mounted closely adjacent the junction of the outer leg portion and said base portion with said rim extending outward from said junction in an axial direction to an extent that positions the outer peripheral area of the rim closer than the outer ends of either of said legs to said junction, said base portion and said inner and outer leg portions being formed as an integral unit and being substantially impervious to air, and wall means defining apertures through said rim portion to enable air to pass therethrough.

* * * * *